Sept. 23, 1930.  E. S. JOHNSON  1,776,691
CORN POPPER
Filed Aug. 19, 1929
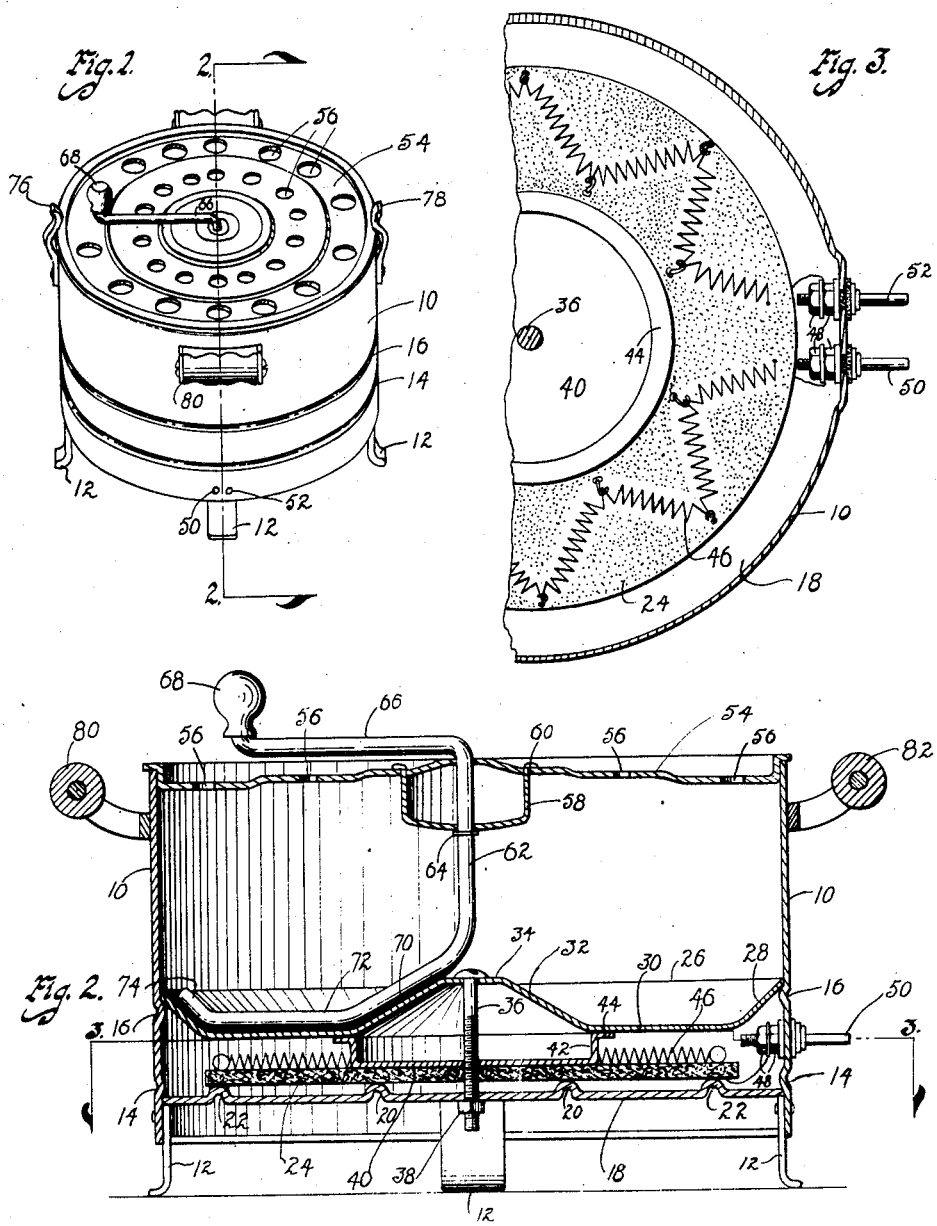
Witness
Carl Bloomburg
Inventor
Ernest S. Johnson
by Bair, Freeman & Sinclair
Attorneys Patented Sept. 23, 1930

1,776,691

UNITED STATES PATENT OFFICE

ERNEST S. JOHNSON, OF WEBSTER CITY, IOWA, ASSIGNOR TO KNAPP-MONARCH COMPANY, OF WEBSTER CITY, IOWA

CORN POPPER

Application filed August 19, 1929. Serial No. 386,905.

The object of this invention is to provide an improved construction for an electrically heated corn popper.

A further object of the invention is to provide an improved corn popper having ample capacity for the popped corn and at the same time having a restricted area for supporting the unpopped corn, thereby permitting a concentration of the heating elements and resulting in a conservation of energy required for the popping operation.

More specifically an object of the invention is to provide an electric corn popper having a false bottom to support the corn, said bottom being formed with a restricted horizontal area for supporting the unpopped corn and with sloping areas above which the popped corn may be positioned, the heating elements being arranged only beneath the horizontal area of the false bottom.

Another and further object of the invention is to provide a simple and durable construction for an electrically heated corn popper, including novel means for assembling the various parts of the device.

Still another object of the invention is to provide an improved agitating member and means for journaling said member for rotary movement.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my improved corn popper.

Figure 2 is a vertical section on the line 2—2 of Figure 1.

Figure 3 is a horizontal section of a portion of the device on the line 3—3 of Figure 2.

My improved corn popper includes a cylindrical rim or wall 10 which may be supported by a plurality of legs 12 which are riveted or otherwise suitably secured to the lower portion thereof.

The cylindrical wall or rim 10 is formed with two beads or ribs pressed inwardly and spaced apart in the lower portion thereof, said beads or ribs being arranged circumferentially and being designated by the numerals 14 and 16.

A bottom member 18 is arranged within the lower portion of the cylindrical wall 10 and closes the same. The bottom member 18 as here shown rests against the lowermost bead 14 and is supported upon the upper ends of the legs 12.

The bottom member 18 is formed with a plurality of annular beads or ribs, in this instance two in number and designated by the numerals 20 and 22. The beads or ribs 20 and 22 project upwardly from the surface of the bottom member 8 and preferably are concentrically arranged.

Resting upon the ribs 20 and 22, and supported thereby in spaced relation to the body of the bottom member 18, is an insulating plate 24, of less diameter than the bottom member 18 and wall member 10. The plate 24 may be formed of asbestos or any other suitable insulating material.

A false bottom is mounted within the cylindrical wall member 10 and is designated generally by the numeral 26. The false bottom 26 is arranged with its marginal portion resting upon the uppermost bead 16 and is supported thereby in spaced relation to the bottom member 18 and the insulating plate 24.

The false bottom 26 is of peculiar construction and includes an outer annular portion 28 which slopes downwardly from its margin and communicates with a restricted horizontal portion 30 of annular shape. The inner circumference of the annular horizontal portion 30 communicates with an upwardly sloping annular portion 32 which terminates in an elevated horizontal portion of small diameter at the center of the false bottom, this central horizontal portion being designated by the numeral 34.

It will be noted that because of this peculiar construction of the false bottom 26, its upper surface is divided into three principal portions, namely a horizontal portion 30 which is arranged between an outer sloping portion 28 and an inner sloping portion 32 and that this horizontal portion occupies an area comprising preferably not more than one half of the total area of the false bottom.

The small central elevated horizontal portion 34 is provided merely for convenience in receiving a connecting member such as a bolt 36 which extends centrally through the false bottom 26 and through the insulating plate 24 and bottom member 18, and is provided with a nut 38 on its lower end.

A spacing member 40 is provided and this member is of considerably less diameter than the bottom member 18 and wall member 10. The spacing member 40 rests on the central portion of the insulating plate 24 and is centrally apertured to receive the connecting bolt 36. The spacing member is formed with an upwardly extending rim portion 42 which is turned outwardly at its upper margin to form a peripheral flange 44 which extends a slight distance beneath the horizontal portion 30 of the false bottom.

When the bottom member 18, insulating plate 24, spacing member 40 and false bottom 26 are assembled as shown and described and the connecting member 36 with its nut 38 are placed in position, the parts are rigidly bound together in the desired assembled relation.

Before this assembling operation is completed the heating elements 46 are placed in position on the insulating plate 24. The heating elements 46 preferably are in the form of coils arranged in zig-zag relation about the spacing member 40 as shown in Figure 3. Thus the heating elements are arranged in substantially annular form on the outer annular portion of the insulating plate 24 and are arranged only beneath the horizontal portion 30 of the false bottom. The heating elements are connected by means of nuts 48 to the threaded inner ends of terminal posts 50 and 52 which are mounted in spaced relation through the wall member 10 and are designed to receive the connection of a suitable appliance plug (not shown) attached to a cord whereby the device may be associated at the will of the operator with an electric light socket or the like. This is the usual form of attaching means for connecting electrical appliances to a source of electrical energy.

The cylindrical wall member 10 is provided with a flanged lid 54 having a plurality of apertures 56 therein.

Mounted beneath the central portion of the lid 54 is a cylindrical bearing member 58 which may be supported from the lid by means of lugs 60.

An agitator shaft 62 is arranged vertically and journaled in the central part of the lid 54 and bearing member 58 and is provided with a stop collar 64 beneath said bearing member to limit or prevent upward movement of the shaft.

The agitator shaft 62 is bent laterally at right angles immediately above the lid 54 to provide a crank portion 66 which terminates in an upwardly projecting knob or handle 68 whereby the shaft may be manually rotated.

It will be noted that the main portion of the agitator shaft 62 is arranged vertically and axially of the container and that the lower portion thereof is shaped to conform quite closely to the upper surface of the false bottom 26.

At a point immediately above the center of the false bottom 26, the agitator shaft 62 is bent downwardly and laterally at an angle to produce the inclined portion 70 which is adapted to contact with the inclined portion 32 of the bottom when the cover and agitator are in place. The inclined portion 70 is again bent at an angle to produce the horizontal portion 72 which is adapted to coact with the horizontal portion 30 of the bottom. The horizontal portion 72 terminates in an upwardly and outwardly direction 74 which is adapted to contact with the outward inclined portion 28 of the false bottom.

In this way an agitating device is produced which is designed, upon rotation of the shaft 62 through its crank and handle 68, to move in close contact with the various surfaces of the false bottom 26.

In practical use the device is suitably connected with an electric circuit to cause the heating elements 46 to be heated and a quantity of pop corn is placed in the container and the lid 54 is placed in position. A pair of spring clips or latches 76 and 78 are oppositely disposed at the upper marginal portion of the wall member 10 for engaging the flanged lid 54 and holding it in place.

The heavy unpopped kernels of corn will naturally assume positions upon the horizontal portion 30 of the false bottom, being prevented by force of gravity from resting on the inclined portions thereof.

Inasmuch as the horizontal portion 30 occupies only a restricted part of the total area of the false bottom 26, and the heating elements 46 are arranged only beneath such horizontal portions, it is obvious that I have provided a means whereby the heat is concentrated and applied to those portions of the false bottom which must necessarily be occupied by the unpopped kernels.

The agitator shaft is rotated manually to cause a continuous or practically continuous movement of the kernels of corn to prevent burning.

As the corn is gradually popped by the application of heat, the relatively light popped kernels are permitted to assume positions above and at both sides of the horizontal portion 30 of the false bottom, namely upon and above the inclined portions 28 and 32 as well as above the horizontal portion 30. Thus provision is made in the container for taking care of the greater volume of popped corn and at the same time insuring that the unpopped kernels will remain in that portion where the heat is directly applied.

This insures a more even popping of the corn in a shorter period of time and is efficacious in accomplishing popping operation with the use of a minimum amount of electric energy.

A pair of handles 80 and 82 are oppositely disposed on the wall member 10 for convenience in handling the device.

The corn popper constructed in accordance with my invention is simple and durable and is efficient for the purpose for which it is designed.

The method of assembling the bottom and false bottom relative to the cylindrical wall 10 and of providing a space between them for the heating elements is believed to be novel and useful.

I claim as my invention:

1. In a device of the class described, a receptacle having a bottom and a false bottom spaced apart, an insulating plate resting on said bottom, a spacing member on said insulating plate engaging the central portion of said false bottom, heating elements arranged in annular form on said insulating plate around said spacing member, and a connecting member extending through said bottom, insulating plate, spacing member and false bottom and binding said parts in assembled relation.

2. In a device of the class described, a receptacle having a wall member, and having a bottom and a false bottom spaced apart within said wall member, said wall member being formed with spaced ribs on its inner surface against which the margins of the bottom and false bottom may respectively engage, an insulating plate resting on said bottom, a spacing member on said insulating plate engaging the central portion of said false bottom, heating elements arranged in annular form on said insulating plate around said spacing member, and a connecting member extending through said bottom, insulating plate, spacing member and false bottom and binding said parts in assembled relation.

3. In a device of the class described, a receptacle having a bottom and a false bottom spaced apart, said bottom being formed with upwardly projecting beads, an insulating plate resting on the beads of said bottom, to space said insulating plate above the plane of said bottom, a spacing member on said insulating plate engaging the central portion of said false bottom, heating elements arranged in annular form on said insulating plate around said spacing member, and a connecting member extending through said bottom, insulating plate, spacing member and false bottom and binding said parts in assembled relation.

4. In a device of the class described, a receptacle having a peripheral wall, and having a bottom and a false bottom spaced apart and each fitting snugly within said wall, said wall being formed with vertically spaced internal projections against which the margins of the bottom and false bottom may engage respectively from below and above, an insulating member resting on said bottom, a spacing member on said insulating member engaging said false bottom, heating elements arranged on said insulating member, and connecting means extending through the bottom and false bottom for holding the parts in assembled relation.

Des Moines, Iowa, July 25, 1929.

ERNEST S. JOHNSON.